United States Patent [19]

Chen

[11] Patent Number: 5,044,706

[45] Date of Patent: Sep. 3, 1991

[54] OPTICAL ELEMENT EMPLOYING ASPHERICAL AND BINARY GRATING OPTICAL SURFACES

[75] Inventor: Chungte W. Chen, Irvine, Calif.

[73] Assignee: Hughes Aircraft Company, Los Angeles, Calif.

[21] Appl. No.: 475,526

[22] Filed: Feb. 6, 1990

[51] Int. Cl.$^5$ .......................... G02B 3/02; G02B 3/08; G02B 5/18; G02B 9/34

[52] U.S. Cl. .................................... 359/357; 359/356; 359/565; 359/571; 359/728; 359/771

[58] Field of Search ................. 350/162.16, 452, 443, 350/1.2, 1.3, 1.4, 162.22, 469

[56] References Cited

U.S. PATENT DOCUMENTS

| | | | |
|---|---|---|---|
| 3,572,903 | 3/1971 | Hofmann | 350/452 |
| 3,904,281 | 9/1975 | Jampolsky | 350/452 |
| 4,293,196 | 10/1981 | Hilbert | 350/452 |
| 4,787,722 | 11/1988 | Claytor | 350/452 |
| 4,881,805 | 11/1989 | Cohen | 350/162.16 |
| 4,950,057 | 8/1990 | Shirayanagi | 350/452 |

OTHER PUBLICATIONS

Swanson et al, "Infrared Application of Diffractive Optical Elements,"*SPIE Proceedings*, vol. 885, 1988, Paper No. 22.

Primary Examiner—Bruce Y. Arnold
Assistant Examiner—Martin Lerner
Attorney, Agent, or Firm—William J. Streeter; W. K. Denson-Low

[57] ABSTRACT

An optical element (12) has aspherical (14) and binary grating (16) optical surfaces. In the preferred embodiment, the optical element (12) is a positive meniscus optical element made of germanium having a useful spectral bandpass in the infrared wavelength region. A telescope (100) includes a first positive meniscus optical element (102), having a convex aspherical surface (104) and a concave binary grating surface (106). A first negative meniscus optical element (107) having a concave binary grating surface (108) and a concave aspherical surface (110) is employed. Next is a positive power lens (112), followed by a second negative meniscus lens (118). In the preferred embodiment, the first negative meniscus optical element (107) and the positive power lens (112) are affixed to a common housing (124), which is removable from the telescope system. Removal of the housing (124) converts the telescope (100) system from a wide-field-of-view telescope (100) to a narrow-field-of-view telescope (40).

17 Claims, 2 Drawing Sheets

OPTICAL ELEMENT EMPLOYING ASPHERICAL AND BINARY GRATING OPTICAL SURFACES

BACKGROUND OF THE INVENTION

1. Technical Field

This invention relates to the techniques for eliminating aberration in optical systems and, more particularly to an optical element employing aspherical and binary grating optical surfaces.

2. Discussion

An image produced by an optical system has imperfections, called aberrations. Aberrations can take many forms. For example, chromatic or color aberration is a consequence of dispersion. Shorter wavelengths are bent the most, and focus nearest the lens, while the longer wavelengths focus farther from it. Spherical aberration results when spherical lens surfaces are used. Light striking nearer the periphery focuses closer to the lens while light striking near the center focuses farther away. Spherocromatism (or spherochromatic aberration) is a type of spherical aberration in which the focal points of light rays vary with the wavelength of the light. Finally, coma is an aberration that distorts images formed by off-access light rays that do not strike the lens and its center.

Conventional optical systems often require additional lenses to correct for aberrations, thereby adding cost, weight, size, and/or complexity. For example, most lenses designed for astronomical purposes consist of two elements of different indices of refraction The curvatures of the spherical surfaces of the elements are designed to reduce both the spherical and chromatic aberrations to a tolerable amount. Without corrective lenses, conventional optical systems would be limited by chromatic aberration to low speeds or focal ratios.

One alternative to adding lenses to correct for aberrations is the use of diffractive surfaces, such as one of many types of computer-generated Fresnel zone plates on at least one side of a lens. A high efficiency binary approximation of a Kinoform-type Fresnel zone plate, called a binary grating surface, has been disclosed for use in infrared systems by Swanson and Veldkamp in "Infrared Applications of Diffractive Optical Elements", SPIE Proceedings, Vol 885, paper #22, 1988. They further disclose the use of such a surface with a conventional or spherical lens. The spherical lens surface provides focusing, and the diffractive surface corrects for as much of the spherical aberration as is possible However, the use of a binary grating surface for correction of spherical aberration results in a significant amount of spherocromatism. Furthermore, since low speeds or focal ratios are required to limit this chromatic aberration, the usable optical speed is significantly limited.

SUMMARY OF THE INVENTION

In accordance with the teachings of the present invention, an optical element having aspherical and binary grating optical surfaces is provided In the preferred embodiment, the optical element is a positive meniscus optical element made of germanium having a useful spectral bandpass for energy in the infrared wavelength region. The invention encompasses embodiments having other element shapes and using other materials, such as glass, and having a useful spectral bandpass for energy in other wavelength regions.

In addition, a telescope system incorporating two of the optical elements is disclosed. In its wide-field-of-view configuration, the system employs a first positive meniscus optical element as an objective element, having a convex aspherical surface and a concave binary grating surface. Then a first negative meniscus optical element is used, having a concave binary grating surface and a concave spherical surface. Next is a positive power optical element, followed by a second negative meniscus optical element. The first negative meniscus optical element and the positive power optical element are affixed to a common housing, which is removable from the telescope system. The remaining optical elements form a narrow-field-of-view telescope. In the preferred embodiment, each optical element in the system is made of germanium for use in the infrared wavelength region.

BRIEF DESCRIPTION OF THE DRAWINGS

The various advantages of the present invention will become apparent to one skilled in the art after reading the following specification and by studying the drawings in which.

DETAILED DESCRIPTION OF THE PREFERRED EMBODIMENT

Figure 2:
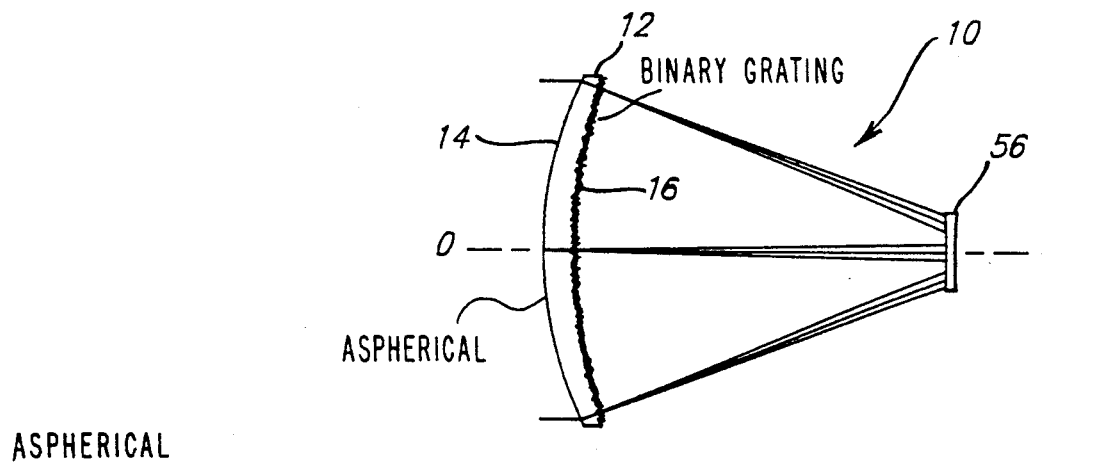
FIG. 2 is a profile view of a narrow field FLIR telescope employing an optical element made in accordance with the teachings of this invention.

Turning first to FIG. 2, the optical element 12 is shown as part of a narrow-field-of-view telescope 10. It has an aspherical surface 14 and a binary grating surface 16. In this particular embodiment, the optical element 12 is a germanium positive meniscus lens, finding particular utility in the wavelength range between 8 and 12 microns. The aspherical surface 14 is employed to avoid much of the spherical aberration common to spherical lenses. The binary grating surface 16 is used to eliminate spherochromatism and primary chromatic aberration.

The aspherical surface 14 is formed in one of two ways. A disk of lens material is usually placed on a lathe, which shapes the surface 14 using a computer-controlled cutting device. Alternatively, conventional grinding and polishing techniques may be used, although this method is more time consuming and expensive.

Figure 3:
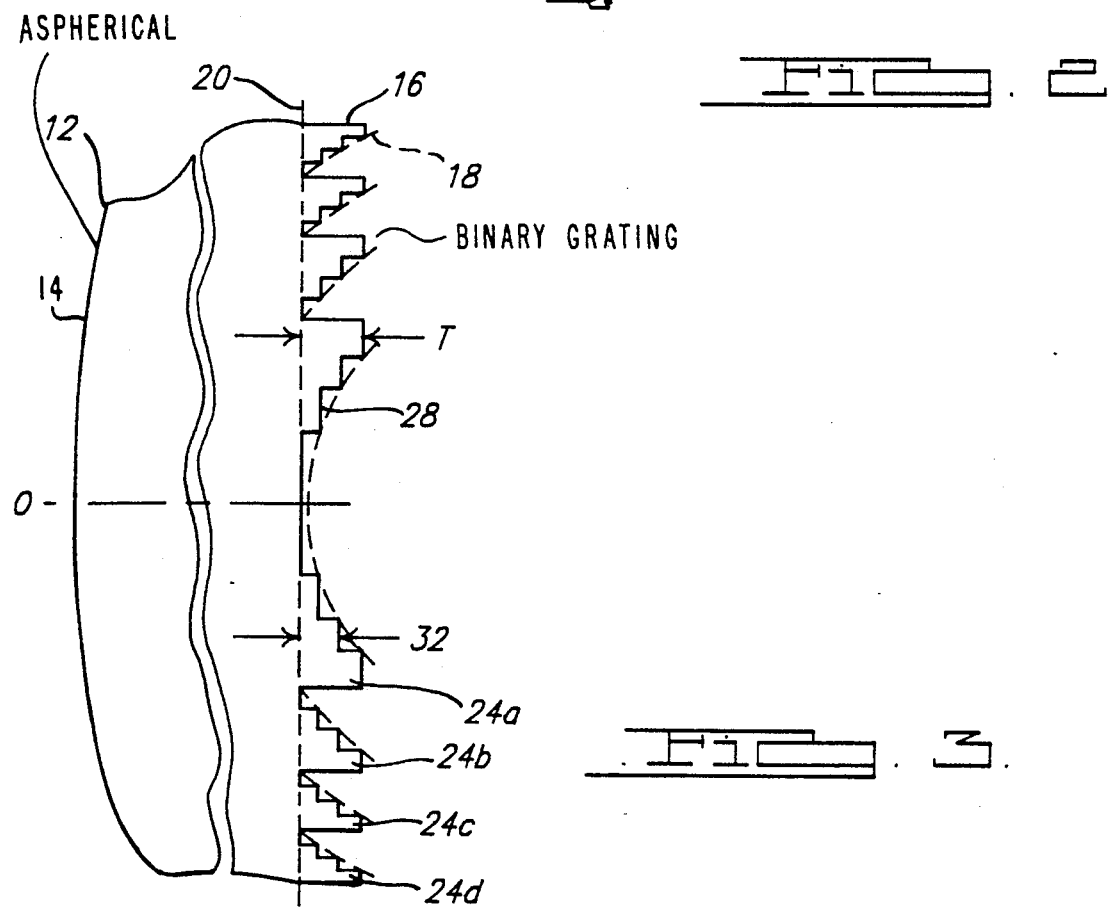
FIG. 3 is a enlarged profile view of the binary grating surface on the optical element.

Turning now to FIG. 3, the binary grating surface 16 uses Fresnel diffraction. There are many types of Fresnel zone plates. The Fresnel zone plate used in this invention is of the Kinoform type, due to its high efficiency. The Kinoform phase profile 18 describes the theoretical boundary of the binary grating surface 16. The profile 18 is determined by the formula $$\phi(\rho)|_{2\pi} = 2\pi Q(z_2 - z_1) \quad (1)$$

where $z_n =$ $$c_n\rho^2/[1 + \sqrt{1 - (k_n + 1)c_n^2\rho^2}] + d_n\rho^4 + e_n\rho^6 + f_n\rho^8 + g_n\rho^{10}$$

where phase, $\phi$, is measured between the base 20 and the profile 18 in radians, Q is a constant and a function of the average wavelength, $c_n$, $k_n$, $d_n$, $e_n$, $f_n$ and $g_n$ are coefficients to describe the phase profile of a binary grating surface, and where is the radial coordinate of the optical element 12. The radian distance $\phi$ of $2\pi$ corresponds to a grating surface thickness 26 of $\bar{\lambda}/(n=1)$, where n is the index of refraction of the optical element 12. $\bar{\lambda}$ is the average wavelength.

The binary grating surface 16 of the present invention advantageously uses a series of phase levels 28 to approximate the shape of the Kinoform profile 18. Concentric rings 24 (a-d) are located at radial distances where the optical path length is an integer. Each ring 24 is divided equally into steps or phase levels 28. As the number of phase levels 28 increases, the efficiency of the binary grating surface 16 approaches the Kinoform profile efficiency of 100%. In the preferred embodiment, the binary grating surface 16 has a thickness T of 3.33 microns, based on the average wavelength of 10 microns. It employs sixteen phase levels 28 (although only three are illustrated for the sake of clarity) and each having a depth 32 of $\pi/8$ radians (0.208 microns) to produce the surface 16. For depths than $\pi/8$, the efficiency is over 99%.

The binary grating surface 16 is preferably made using a number of masks, N, which are related to the number of phase levels, L according to the formula:

$$2^N = L$$

For example, to produce sixteen phase levels 28, four masks are required.

In more detail, the forming process begins by employing a highly accurate electron-beam pattern generator to draw a pattern of the binary grating surface 16 and produce a mask. Mask aligners are employed to align patterns over corresponding phase levels 28 that must be protected from the etchant used to selectively remove material from the beginning disk of lens material. Reactive ion ethers are used to etch the unmasked portions of the surface 16.

The binary grating surface 16 can also be produced by using a diamond-tip lathe. Under this method, the cutting device moves radially to the position of each phase level and cuts the disk axially until it reaches the desired phase level 28. This method is also extremely accurate and has applications for shaping other types of lens materials besides semiconductors.

The optical element 12 need not be limited to infrared systems. Most optical systems, including those using glass elements, can benefit from this invention. An important feature of this invention is that it can simultaneously correct primary chromatic aberration, spherical aberration, and spherocromatism of all orders, and third order coma. Lateral chromatic aberration is significantly reduced. In addition, the optical speed of such an optical element 12 can approach a lower theoretical focal ratio or speed of F/0.5.

Figure 1:
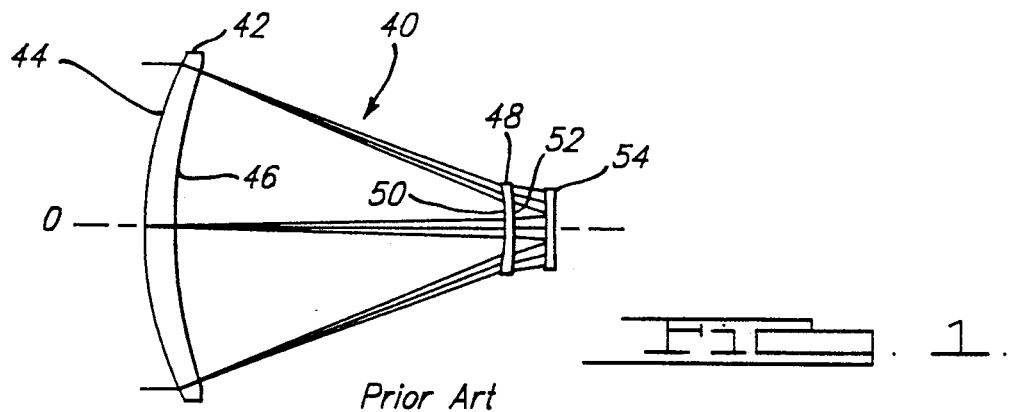
FIG. 1 is a profile view of a narrow field FLIR telescope known in the art.

The advantages associated with the use of this optical element 12 become apparent when the embodiments of the present invention are compared with the known prior art. For example, there is shown in FIG. 1 an optical schematic diagram of a narrow-field-of-view infrared telescope 40 known in the art. The telescope 40 employs three lenses. The objective lens 42 is a positive meniscus germanium lens having spherical surfaces 44 and 46. The second lens 48 is a zinc selenide negative meniscus lens having spherical surfaces 50 and 52. The zinc selenide lens 48 is used to correct for the spherical and chromatic aberration produced by the first lens 42. The third lens 54 is a germanium negative power, double concave, lens, which refracts the light rays into a collimated beam.

Upon turning once again to FIG. 2, the absence of the zinc selenide lens 48 is evident. The optical element 12 incorporating an aspherical surface 14 and a binary grating surface 16 eliminates all but the secondary chromatic aberration and makes the use of the zinc selenide lens 48 unnecessary. In particular, the aspherical surface 14 minimizes the spherical aberration and the binary grating surface 16 controls the spherocromatism. A comparison of the modulation transfer function for the two telescopes 40 and 10 shows that the telescope 10, using the optical element 12, demonstrates better image quality. In addition, the alignment of the telescope 10 is much less sensitive to error than the alignment of telescope 40. Overall the telescope 10 in FIG. 2 produces better image quality at less cost, size, weight and complexity.

A prescription table for the narrow-field-of-view infrared telescope 10 of FIG. 2 is shown below in Table I. In this Table it will be noted that lens A refers to the optical element 12 and lens B refers to the negative meniscus lens 56. The radius refers to the radius of curvature of the particular surface specified in accordance with conventional practice. The thickness refers to the distance along the optical axis 0 from the surface for which the thickness to the next highest numbered surface. Thus, the thickness from surface 1 to surface 2 of lens A is 0.498. The various thicknesses through air between lenses are given below each of the lens thicknesses in the Table. For example, the thickness through air between surface 2 of lens A and surface 3 of lens B is 7.02099 inches.

TABLE 1

| Lens/Surface | Radius | Thickness | Material |
|---|---|---|---|
| A | | | |
| 1* | 7.99881 | | |
| | | 0.498000 | Ge |
| 2 | 10.9423 | | |
| | | 7.02099 | Air |
| B | | | |
| 3 | −7.03619 | | |
| | | 0.120000 | Ge |
| 4 | 9.21997 | | |
| | | 1.00000 | Air |

TABLE 1-continued

| *Surface | k | d | e | f | g |
|---|---|---|---|---|---|
| 1 | 0 | $-0.48613(10^{-5})$ | $-0.75689(10^{-7})$ | $-0.11902(10^{-8})$ | $-0.65944(10^{-10})$ | where $z = c\rho^2/[1 + \sqrt{1 - (k + 1)c^2\rho^2}] + d\rho^4 + e\rho^6 + f\rho^8 + g\rho^{10}$ Surface 2

$Q = 2.6051282(10^6)$ $c_1 = 9.147206(10^{-2})$        $c_2 = 9.138846(10^{-2})$
$k_1 = 0$                        $k_2 = 0$
$d_1 = 6.2893(10^{-10})$         $d_2 = 0$
$e_1 = -8.1445(10^{-12})$        $e_2 = 0$
$f_1 = 2.5868(10^{-14})$         $f_2 = 0$
$g_1 = 4.7146(10^{-16})$         $g_2 = 0$ $\phi = 2\pi Q(z_2 - z_1)$ where $z_n = c_n\rho^2/[1 + \sqrt{1 - (k_n + 1)c_n^2\rho^2}] + d_n\rho^4 + e_n\rho^6 + f_n\rho^8 + g_n\rho^{10}$ All of the lenses are germanium having an index of refraction of 4.003. All of the lens surfaces are spherical except surface 1 which is aspherical. Its curvature is described by the formula z described in Table 1. Referring to equation (1), which describes the theoretical boundary of a binary grating surface, the coefficients describing the phase profile 18 of the binary grating 16 are given at the bottom of Table 1.

Figure 4:
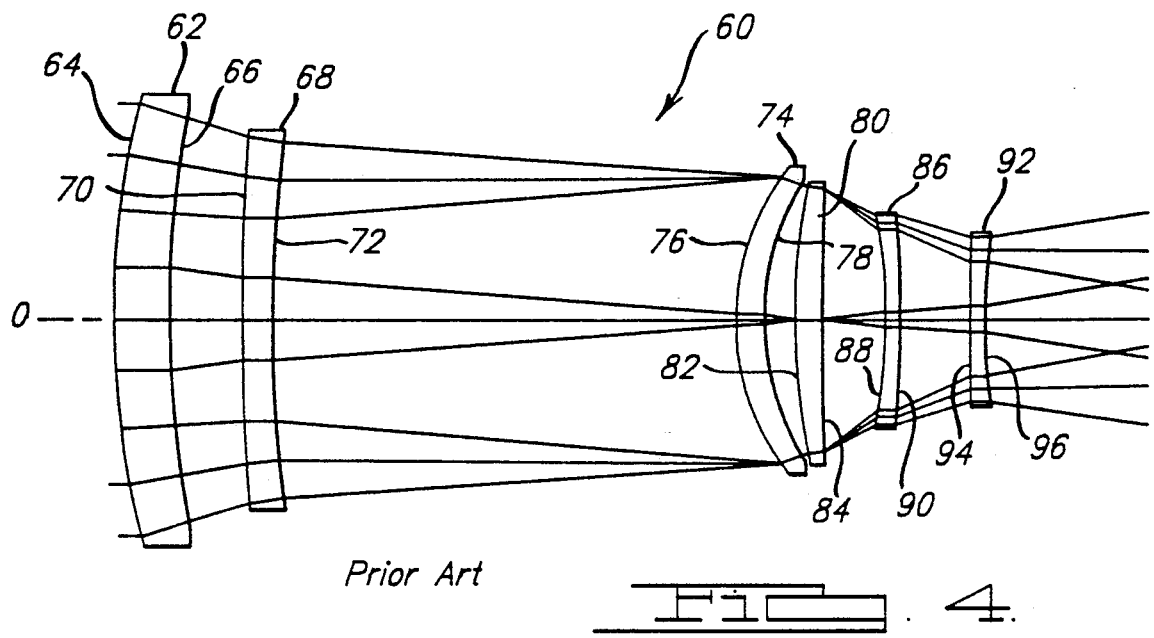
FIG. 4 is a profile view of a wide-field-of-view FLIR telescope known in the art.
Figure 5:
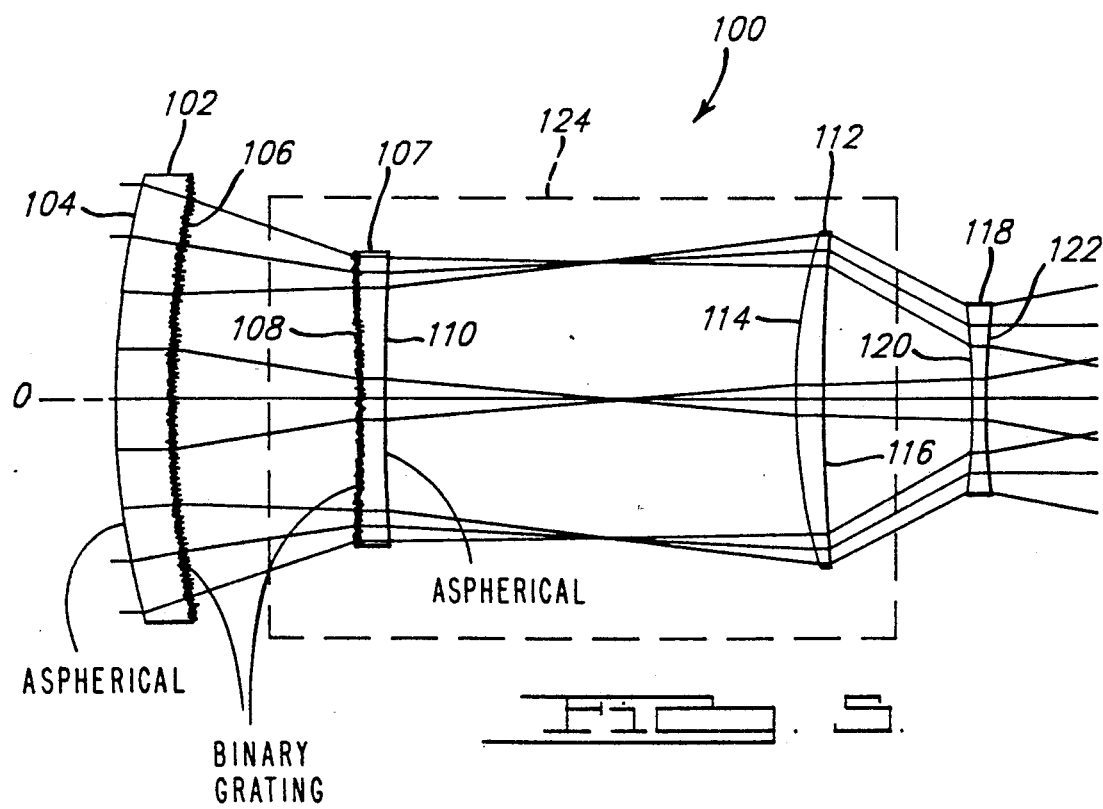
FIG. 5 is a wide-field-of-view FLIR telescope incorporating optical elements made in accordance with the teachings of the present invention.

FIGS. 4 and 5 illustrate the differences between a wide-field-of-view infrared telescope 60 known in the art and a wide-field-of-view infrared telescope 100 incorporating the optical element 12. The prior art telescope 60 incorporates six lenses. The first lens 62 is a positive germanium meniscus lens having spherical surfaces 64 and 66. The second lens 68 is a negative meniscus germanium lens having spherical surfaces 70 and 72. The third lens 74 is a positive meniscus zinc selenide lens having spherical surfaces 76 and 78. The fourth lens 80 is a positive power germanium lens having spherical surfaces 82 and 84. The fifth lens 86 is a zinc selenide negative meniscus lens having spherical surfaces 88 and 90. The sixth lens 92 is a negative power germanium lens having spherical surfaces 94 and 96.

Telescope 100 in FIG. 5 uses only four lenses. The first lens 102 is a positive meniscus germanium lens having an aspherical surface 104 and a binary grating surface 106. The second lens 107 is a negative meniscus optical element having a binary grating surface 108 and an aspherical surface 110. The third lens 112 is a positive power germanium lens having spherical surfaces 114 and 116. The fourth lens 118 is a negative meniscus lens having spherical surfaces 120 and 122. As in the case of the narrow-field-of-view telescope 10, the modulation transfer function curves of the wide-field-of-view infrared telescope 100 reflect a significant improvement in image quality.

Another feature of this embodiment is that the narrow-field-of-view infrared telescope 10 can be formed from telescope 100 by removing the two middle lenses 107 and 112. The remaining lenses 102 and 118 correspond to lens 12 and lens 56 of telescope 10. Lenses 107 and 112 are affixed to a common housing 124 which, when inserted, converts the narrow-field-of-view telescope 10 into the wide-field-of-view telescope 100.

The Prescription Table for the wide-field-of-view infrared telescope is given below. This Table follows the same convention of Table I which was explained in detail above. Lens 102 corresponds to lens A. Lens 107 corresponds to lens B. Lens 112 corresponds to lens C, and lens D corresponds to lens 118. Note also that lens A in Table 1 corresponds to lens A in Table 2 and lens B in Table 1 corresponds to lens D in Table 2.

TABLE 2

| Lens/Surface | Radius | Thickness | Material |
|---|---|---|---|
| A | | | |
| 1* | 7.99881 | | Ge |
| | | 0.498000 | |
| 2 | 10.94223 | | |
| | | 1.66544 | Air |
| B | | | |
| 3 | −55.5654 | | Ge |
| | | 0.250000 | |
| 4* | 20.7530 | | |
| | | 3.60448 | Air |
| C | | | |
| 5 | 5.10270 | | Ge |
| | | 0.235813 | |
| 6 | 17.5633 | | |
| | | 0.126526 | Air |
| D | | | |
| 7 | −7.03619 | | Ge |
| | | 0.120000 | |
| 8 | 9.21997 | | |
| | | 1.00000 | Air |

| *Surface | k | d | e | f | g |
|---|---|---|---|---|---|
| 1 | 0 | $-0.48613(10^{-5})$ | $-0.75689(10^{-7})$ | $-0.11982(10^{-8})$ | $-0.65944(10^{-10})$ |
| 4 | 0 | $0.17374(10^{-4})$ | $0.81055(10^{-4})$ | $0.73735(10^{-4})$ | $-0.34511(10^{-4})$ |

TABLE 2-continued where $z = c\rho^2/[1 + \sqrt{1 - (k + 1)c^2\rho^2}] + d\rho^4 + e\rho^6 + f\rho^8 + g\rho^{10}$

| Surface 2 | Surface 3 |
|---|---|
| $Q = 2.6051282(10^6)$ | $Q = 2.6051282(10^6)$ |
| $c_1 = 9.147206(10^{-2})$ | $c_1 = 1.799807(10^{-2})$ |
| $c_2 = 9.138846(10^{-2})$ | $c_2 = 1.799681(10^{-2})$ |
| $d_1 = 6.2893(10^{-10})$ | $d_1 = 6.2893(10^{-10})$ |
| $e_1 = -8.1445(10^{-12})$ | $e_1 = -8.1445(10^{-12})$ |
| $f_1 = 2.5868(10^{-14})$ | $f_1 = 2.5868(10^{-14})$ |
| $g_1 = 4.7146(10^{-16})$ | $g_1 = 4.7146(10^{-16})$ |
| $k_1 = k_2 = d_2 = e_2 = f_2 = g_2 = 0$ | $k_1 = k_2 = d_2 = e_2 = f_2 = g_2 = 0$ |
| $\phi = 2\pi Q(z_2 - z_1)$ | | where $z_n = c_n\rho^2/[1 + \sqrt{1 - (k_n + 1)c_n^2\rho^2}] + d_n\rho^4 + e_n\rho^6 + f_n\rho^8 + g_n\rho^{10}$ The coefficients of equation (1) describing the phase profile of the binary grating 108 are given at the bottom of Table 2.

Although the invention has been described with particular reference to certain preferred embodiments thereof, variations and modifications can be effected within the spirit and scope of the following claims.

What is claimed is:

1. An optical element for reducing aberration in an optical system, said optical element having first and second surfaces, said first surface being an aspherical surface and said second surface being a diffractive surface and, wherein said second surface is a binary grating surface including a plurality of concentric rings, each ring having a series of phase level steps for approximating a Kinoform profile.

2. The optical element of claim 1, wherein said first surface is convex and said second surface is concave.

3. The optical element of claim 1, wherein said first and second surfaces are concave.

4. The optical element of claim 1 made of germanium.

5. The optical element of claim 1, being capable of correcting primary chromatic aberration, spherical and spherochromatic aberration of all orders, and third order coma and reducing lateral chromatic aberration for focal ratios as low as F/0.5.

6. The optical element of claim 1, having a useful spectral bandpass for energy in the infrared wavelength region.

7. An optical element for reducing aberration in an optical system, said optical element having first and second surfaces, said first surface being an aspherical surface and said second surface being a binary grating surface, said optical element being made of germanium and having a useful spectral bandpass for energy in the infrared wavelength region.

8. The optical element of claim 7 wherein said binary grating surface comprises:
a plurality of concentric rings, each ring having a series of phase level steps for approximating a Kinoform profile.

9. The optical element of claim 7, being capable of correcting primary chromatic aberration, spherical and spherochromatic aberration of all orders, and third order coma, and reducing lateral chromatic aberration, for focal ratios as low as F/0.5.

10. A telescope system having an optical axis comprising:
(a) a first positive meniscus optical element on said optical axis, having a first convex surface and a second concave surface, said first surface being an aspherical surface and said second surface being a binary grating surface;
(b) a first negative meniscus optical element, on said optical axis behind said first positive meniscus optical element and having first and second concave surfaces, said first surface being a binary grating surface and said second surface being an aspherical surface;
said binary grating surfaces comprising a plurality of concentric rings, each ring having a series of phase level steps for approximating a Kinoform profile;
(c) a positive power optical element, on said common optical axis behind said first negative meniscus optical element, having surfaces which are substantially spherical; and
(d) a second negative meniscus optical element, on said optical axis behind said positive power optical element.

11. The telescope of claim 10, wherein said first positive meniscus optical element, said first negative meniscus optical element, said positive power optical element, and said second negative meniscus optical element are made of germanium and have a useful spectral bandpass within the infrared wavelength region.

12. The telescope of claim 10, wherein said first positive meniscus optical element and said first negative meniscus optical element are capable of correcting primary chromatic aberration, spherical and spherochromatic aberration of all orders, and third order coma, and reducing lateral chromatic aberration for focal ratios as low as F/0.5.

13. The telescope system of claim 10, wherein the four optical elements comprise the optical elements A, B, C, and D, and are shown in FIG. 5 of the drawings as 102, 107, 112, and 118, and wherein said optical elements are fabricated and mounted in accordance with the following prescription Table 2 wherein "Radius" refers to radius of curvature of the optical element surface indicated by the corresponding number, the "Thickness" refers to the distance along the optical axis 0 from the indicated surface to the surface of next highest number, and the materials are as specified, all of the surfaces being spherical except for the first positive meniscus optical element whose first surface is aspherical and whose curvature constants c, k, d, e, f, and g are given in the Table 2, and the first negative meniscus optical element whose second surface is aspherical and whose curvature constants c, k, d, e, f, and g are given in the Table 2, and wherein the second surface of the first positive meniscus optical element and the first surface of the first negative meniscus optical element are binary grating surfaces whose phase profiles $\phi$ are determined by the constants Q, $c_n$, $k_n$, $d_n$, $e_n$, $f_n$, and $g_n$ at the bottom of Table 2, the measured quantities being stated in inches as follows:

TABLE 2

| Lens/Surface | Radius | Thickness | Material |
|---|---|---|---|
| A | | | |
| 1* | 7.99881 | | |
| | | 0.498000 | Ge |
| 2 | 10.94223 | | |
| | | 1.66544 | Air |
| B | | | |
| 3 | −55.5654 | | |
| | | 0.250000 | Ge |
| 4* | 20.7530 | | |
| | | 3.60448 | Air |
| C | | | |
| 5 | 5.10270 | | |
| | | 0.235813 | Ge |
| 6 | 17.5633 | | |
| | | 0.126526 | Air |
| D | | | |
| 7 | −7.03619 | | |
| | | 0.120000 | Ge |
| 8 | 9.21997 | | |
| | | 1.00000 | Air |

| *Surface | k | d | e | f | g |
|---|---|---|---|---|---|
| 1 | 0 | $-0.48613(10^{-5})$ | $-0.75689(10^{-7})$ | $-0.11982(10^{-8})$ | $-0.65944(10^{-10})$ |
| 4 | 0 | $0.17374(10^{-4})$ | $0.81055(10^{-4})$ | $0.73735(10^{-4})$ | $-0.34511(10^{-4})$ | where $z = c\rho^2/[1 + \sqrt{1 - (k+1)c^2\rho^2}] + d\rho^4 + e\rho^6 + f\rho^8 + g\rho^{10}$

| Surface 2 | Surface 3 |
|---|---|
| $Q = 2.6051282(10^6)$ | $Q = 2.6051282(10^6)$ |
| $c_1 = 9.147206(10^{-2})$ | $c_1 = 1.799807(10^{-2})$ |
| $c_2 = 9.138846(10^{-2})$ | $c_2 = 1.799681(10^{-2})$ |
| $d_1 = 6.2893(10^{-10})$ | $d_1 = 6.2893(10^{-10})$ |
| $e_1 = -8.1445(10^{-12})$ | $e_1 = -8.1445(10^{-12})$ |
| $f_1 = 2.5868(10^{-14})$ | $f_1 = 2.5868(10^{-14})$ |
| $g_1 = 4.7146(10^{-16})$ | $g_1 = 4.7146(10^{-16})$ |
| $k_1 = k_2 = d_2 = e_2 = f_2 = g_2 = 0$ | $k_1 = k_2 = d_2 = e_2 = f_2 = g_2 = 0$ |
| $\phi = 2\pi Q(z_2 - z_1)$ | | where $z_n = c_n\rho^2/[1 + \sqrt{1 - (k_n+1)c_n^2\rho^2}] + d_n\rho^4 + e_n\rho^6 + f_n\rho^8 + g_n\rho^{10}$ 14. The telescope system of claim 10, wherein said first negative meniscus optical element and said positive power optical element are affixed to a common housing, said housing being removable from said telescope system, the remaining first positive meniscus optical element and second negative meniscus optical element forming a telescope having a narrower field of view.

15. A telescope system comprising:
(a) a positive meniscus optical element, having a first convex surface and a second concave surface, said first surface being an aspherical surface and said second surface being a binary grating surface, said binary grating surface comprising a plurality of concentric rings, each ring having a series of phase level steps for approximating a Kinoform profile.
(b) a negative meniscus optical element, aligned on a common optical axis behind said positive meniscus optical element.

16. The telescope system of claim 15, wherein said positive meniscus optical element and said negative meniscus optical element are made of germanium, having a useful spectral bandpass for energy in the infrared wavelength region.

17. The telescope system of claim 15, wherein the two optical elements comprise the optical elements A and B, and are shown in FIG. 2 of the drawings as 12 and 56, and wherein said optical elements are fabricated and mounted in accordance with the following prescription Table 1 wherein "Radius" refers to radius of curvature of the optical element surface indicated by the corresponding number, the "Thickness" refers to the distance along the optical axis 0 from the indicated surface to the surface of next highest number, and the materials are as specified, all of the surfaces being spherical except for the positive meniscus optical element whose first surface is aspherical and whose curvature constants c, k, d, e, f, and g are given in the Table 1, and wherein the second surface of the positive meniscus optical element is a binary grating surface whose phase profile $\phi$ is determined by the constants Q, $c_n$, $k_n$, $d_n$, $e_n$, $f_n$, and $g_n$ at the bottom of Table 1, the measured quantities being stated in inches as follows:

TABLE 1

| Lens/Surface | Radius | Thickness | Material |
|---|---|---|---|
| A | | | |

TABLE 1-continued

| | | | | |
|---|---|---|---|---|
| 1* | 7.99881 | | | |
| | | 0.498000 | | Ge |
| 2 | 10.9423 | | | |
| | | 7.02099 | | Air |
| B | | | | |
| 3 | −7.03619 | | | |
| | | 0.120000 | | Ge |
| 4 | 9.21997 | | | |
| | | 1.00000 | | Air |

| *Surface | k | d | e | f | g |
|---|---|---|---|---|---|
| 1 | 0 | $-0.48613(10^{-5})$ | $-0.75689(10^{-7})$ | $-0.11902(10^{-8})$ | $-0.65944(10^{-10})$ | where $z = c\rho^2/[1 + \sqrt{1 - (k + 1)c^2\rho^2}] + d\rho^4 + e\rho^6 + f\rho^8 + g\rho^{10}$

Surface 2

$Q = 2.6051282(10^6)$

| | |
|---|---|
| $c_1 = 9.147206(10^{-2})$ | $c_2 = 9.138846(10^{-2})$ |
| $k_1 = 0$ | $k_2 = 0$ |
| $d_1 = 6.2893(10^{-10})$ | $d_2 = 0$ |
| $e_1 = -8.1445(10^{-12})$ | $e_2 = 0$ |
| $f_1 = 2.5868(10^{-14})$ | $f_2 = 0$ |
| $g_1 = 4.7146(10^{-16})$ | $g_2 = 0$ |

$\phi = 2\pi Q(z_2 - z_1)$ where $z_n = c_n\rho^2/[1 + \sqrt{1 - (k_n - 1)c_n^2\rho^2}] + d_n\rho^4 + e_n\rho^6 + f_n\rho^8 + g_n\rho^{10}$

UNITED STATES PATENT AND TRADEMARK OFFICE
CERTIFICATE OF CORRECTION

PATENT NO. : 5,044,706
DATED : September 3, 1991
INVENTOR(S) : CHUNGTE W. CHEN It is certified that error appears in the above-identified patent and that said Letters Patent is hereby corrected as shown below:

Column 1, line 61, insert --.-- (period) after "provided".

Column 3, line 12, change the quantity within parentheses from "(n=1)" to --(n-1)--.

Signed and Sealed this

Seventeenth Day of August, 1993

Attest:

BRUCE LEHMAN

*Attesting Officer*  *Commissioner of Patents and Trademarks*